(12) United States Patent
Hourunranta

(10) Patent No.: US 6,983,016 B2
(45) Date of Patent: Jan. 3, 2006

(54) METHOD FOR DETECTING ERRORS IN VIDEO INFORMATION

(75) Inventor: Ari Hourunranta, Tampere (FI)

(73) Assignee: Nokia Mobile Phones, LTD, Espoo (FI)

( * ) Notice: Subject to any disclaimer, the term of this patent is extended or adjusted under 35 U.S.C. 154(b) by 569 days.

(21) Appl. No.: 09/849,803

(22) Filed: May 4, 2001

(65) Prior Publication Data

US 2002/0021755 A1 Feb. 21, 2002

(30) Foreign Application Priority Data

May 5, 2000 (FI) ............................................. 20001059

(51) Int. Cl.
*H04N 7/12* (2006.01)

(52) U.S. Cl. ................ 375/240.12; 382/238; 348/394.1
(58) Field of Classification Search ............ 375/240.12, 375/240.16, 240.27, 240.2, 240.15, 240.17; 382/107, 236, 238; 348/425.1, 416.1, 409.1, 348/394.1
See application file for complete search history.

(56) References Cited

U.S. PATENT DOCUMENTS

| | | | | |
|---|---|---|---|---|
| 5,737,022 A | * | 4/1998 | Yamaguchi et al. | ... 375/240.15 |
| 5,905,812 A | | 5/1999 | Kim | ............................ 382/236 |
| 6,052,415 A | | 4/2000 | Carr et al. | .................. 375/240 |
| 6,421,385 B1 | * | 7/2002 | Uenoyama et al. | ...... 375/240.2 |
| 6,489,996 B1 | * | 12/2002 | Matsumura et al. | ..... 348/416.1 |
| 6,735,249 B1 | * | 5/2004 | Karczewicz et al. | ........ 375/240 |

FOREIGN PATENT DOCUMENTS

| | | |
|---|---|---|
| GB | 2328579 A | 2/1999 |
| WO | WO 00/25522 | 5/2000 |

* cited by examiner

*Primary Examiner*—Gims Philippe
(74) *Attorney, Agent, or Firm*—Perman & Green, LLP (57) ABSTRACT

A method for detecting errors in an image signal. The image signal is produced by dividing an image into image blocks, and coding is performed in which at least predictive coding is performed on an image block to produce inter-coded image information for the image block. The inter-coded image information comprises at least one prediction error block containing prediction error information. A decoding is performed to recover prediction error information contained in the at least one prediction error information contained in the at least one prediction error block. A prediction error block check is performed in which prediction error information contained in the at least one prediction error block is examined to detect errors in the inter-coded image information for the image block.

46 Claims, 9 Drawing Sheets

METHOD FOR DETECTING ERRORS IN VIDEO INFORMATION

CROSS-REFERENCE TO RELATED APPLICATIONS

Not Applicable

STATEMENT REGARDING FEDERALLY SPONSORED RESEARCH OF DEVELOPMENT

Not Applicable

INCORPORATION-BY-REFERENCE OF MATERIAL SUBMITTED ON A COMPACT DISC

Not Applicable

BACKGROUND OF THE INVENTION (1) Field of The Invention

The present invention relates to a method as presented in the preamble of the appended claim 1 for detecting errors in video information. The present invention also relates to another method as presented for detecting errors in video information. The present invention also relates to a terminal device. The present invention also relates to another terminal device. The present invention further relates to a data transmission system. The present invention further relates to another data transmission system. Moreover, the present invention relates to a decoder. The present invention relates to another decoder. The present invention also relates to a storage means. The present invention further relates to another storage means.

(2) Description of Related Art Including Information Disclosed Under 37 CFR 1.97 and 1.98

One of the objectives of telecommunication is to provide systems in which good quality real-time data transmission is available by means of video, audio and data information. It is generally known that the amount of information required to transmit images is considerably larger than in many other types of data transmission, such as audio and text data transmission, and thus the transmission of video signals to low bit-rate terminals has so far not been practicable. However, the transmission of information in digital form has made it possible to improve the signal-to-noise ratio and the data transmission capacity in data transmission channels. Services having higher data transmission rates are currently under development for mobile terminals such as wireless telephones, wherein the transmission of video to such mobile terminals will also become viable.

To optimise the use of the data transmission channel, signals are generally compressed before transmission. This is especially important in the transmission of video information, in which the amount of information to be transmitted is large. On the other hand, however, a compressed video signal is easily affected by data transmission errors, for example because variable length codes are generally used to compress the video signal. Thus, if a bit error alters a code word to another code word of a different length, the decoder loses synchronization and may even decode subsequent error-free blocks erroneously until the next synchronization code is received correctly.

To reduce degradations in image quality caused by transmission errors, at the decoding stage it is possible to employ error detection and/or correction, retransmission, and/or attempts can be made to conceal disturbances caused by the erroneous data received. Typically, retransmissions provide a reasonable way to protect the data transmission from errors, but if a low data transmission rate is used and the number of errors is relatively large, retransmission cannot be used in practice, especially in video applications. Error detection and correction methods typically require a large amount of additional information to be transmitted, because error detection and correction methods are based on redundancy. Thus, in low bit-rate applications, error concealment is an advantageous method for reducing the effect of transmission errors.

In order to conceal or reduce the effect of transmission errors, the errors have to be detected and located. The more it is possible to find out about the location of an error, the better the methods for concealing errors can operate, which means that it is also possible to attain a better image quality. It is particularly important that the error detection methods detect errors which can be easily discerned by the human eye.

It is possible to transmit a video signal via mobile communication networks, for example using a high speed circuit switched data (HSCSD) connection. Furthermore, third generation mobile communication systems are also designed to transmit multimedia information, in which case the information to be transmitted can also contain video signals. In such future mobile communication systems, the data transfer rates can be of the same order as in present-day landline communication systems (PSTN, Public Switched Telephone Network) or may even exceed them. However, in mobile communication systems, the data transmission channels are more susceptible to interference, and thus the number of transmission errors is larger than in landline communication networks. Furthermore, in mobile communication networks the round-trip delay is larger than in landline communication networks. The round-trip delay represents the time that elapses between the transmission of a retransmission request and the reception of a retransmitted frame. A retransmission request is transmitted by a terminal which receives an erroneous frame to the transmitting terminal, which retransmits the erroneously received frame. In practice, the larger round-trip delays and larger error probability mean that retransmission cannot be used in connection with the transmission of real-time video information, in mobile communication networks. Therefore, communication systems should be designed to tolerate errors.

The inter-coding of video signals is a very efficient compression method, because it can reduce the amount of information to be transmitted to as little as a hundredth part of the original uncompressed information. Inter-coding is based on motion compensation and prediction error coding. In existing video coding standards, images are typically processed in blocks of 8×8 pixels. Four luminance blocks (Y), a first chrominance block (U) and a second chrominance block (V) together form a macroblock. The luminance information effectively represents the grey tone information of the image. The chrominance components of the image indicate colour differences and when the chrominance components are combined with the luminance component, the video decoder produces a colour image.

Motion compensation is a method in which a video encoder detects image blocks in a current image which correspond either exactly or substantially with blocks that appear in a previously encoded and transmitted reference picture. If the encoder detects an image block which has a substantial correspondence with a block in the reference picture, the encoder produces a motion vector (MV). The motion vector is a direction vector which indicates the difference in location between the two corresponding blocks to the decoder in the receiver, i.e. it indicates the shift of the block in the horizontal and vertical direction with respect to the reference image. If the blocks do not completely correspond with each other, the encoder also produces a prediction error block, which comprises information representing the difference between the image block in the current picture and the corresponding block in the reference picture. In this way, the decoder is able to reconstruct a block corresponding substantially to the original block, at a location indicated by the motion vector, using the motion vector and the prediction error block. The prediction error block indicates the pixel-by-pixel difference between the actual pixel information contained in the block and the pixel information produced with the aid of the motion vector. In prior art video coding systems, the prediction error is compressed using a discrete cosine transform (DCT), quantisation and variable length codes (VLC).

A compressed video signal is susceptible to errors mainly for two reasons: i). video coding is based on predictive differential coding, and ii). the information symbols are coded primarily using variable length codes. The predictive nature of video compression causes errors to propagate in the image, both in time and from one area of an image to another. This means that when an error occurs in an image, its effect in the decoded image is visible for a relatively long time. Intra-coding prevents the propagation of errors because an intra picture is produced only on the basis of the information of the image to be coded. The level of compression achieved by an intra-coded picture is low, and thus the number of intra-coded pictures in a video signal should be kept as small as possible, especially in low bit-rate data transmission. Variable length codes are susceptible to errors, because bit errors can change one code word into another one, whose length is not necessarily the same as the length of the original code word. Thus, the decoder does not remain synchronized with the bit stream and may also wrongly decode error-free blocks.

Figure 1:
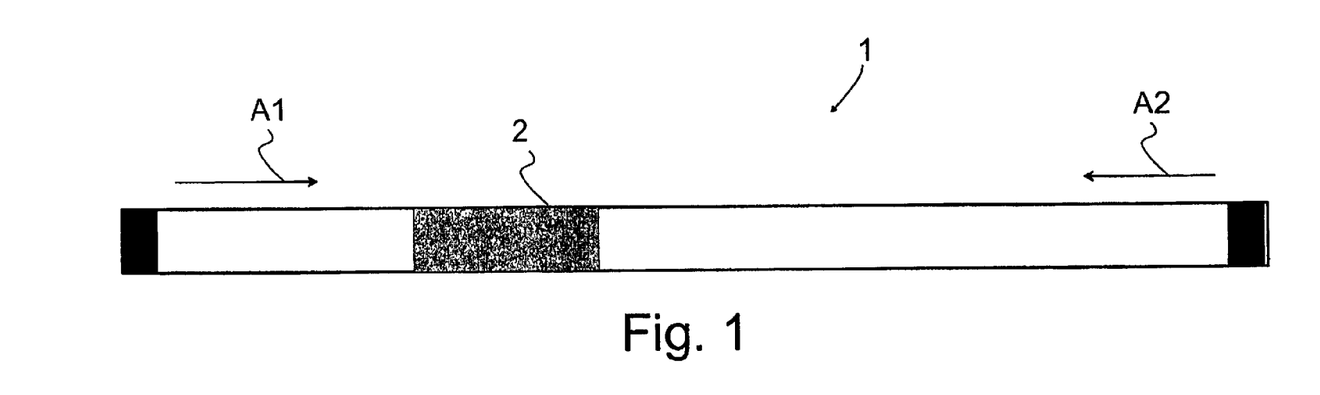
FIG. 1 illustrates the decoding of a variable length code in a situation where a transmission error has occurred.

In MPEG-4 compression, it is possible to use reversible variable length codes (RVLC) to code prediction error blocks. A reversible variable length code is a code word that can be decoded in either direction, as illustrated by arrows A1 and A2 in FIG. 1. To exploit this property, the video information is preferably divided into three different partitions, in such a way that one partition comprises the RVLC coded prediction error blocks. This partition is framed with synchronization bytes before transmission. Backward decoding can thus be used if an error or errors occur in the central portion of such a partition. In such a situation, the decoder can search for the next synchronization word to determine the end of the partition, and then decode the end of the erroneous partition. However, if the coding were conducted from the beginning to the end of the partition using standard (unidirectional) variable length codes, the portion of the partition after the location of the error would have to be rejected, even if it were error-free. The above-described situation is illustrated in the appended FIG. 1, where the reference numeral 2 indicates data transmission errors occurring in section 1. A problem in the use of reversible variable length coding is, for instance, that the errors should be located accurately so that backward decoding can be used effectively.

Methods, such as the identification of invalid code words have been developed for detecting transmission errors in data coded using variable length codes. However, the methods developed are not sufficiently reliable, since they do not detect all the errors. Furthermore, such methods usually detect the errors too late, in practice only after a few erroneously received blocks have already been decoded. It has been suggested that in such a situation the decoder should shift a few macroblocks backwards on detecting an error, under the assumption that the error has been detected too late. This arrangement, however, has the drawback that even blocks which have been received error-free may be rejected and, on the other hand, the decoder is not necessarily shifted sufficiently far backwards.

BRIEF SUMMARY OF THE INVENTION

It is an aim of the present invention to provide a method for detecting errors in a video signal and a video signal transfer system in which the detection of errors is more effective when compared to prior art. A method according to the present invention is characterized by what is presented in the appended claim 1. A method according to another advantageous embodiment of the present invention is characterized by what is presented. A terminal device according to the present invention is characterized by what is presented. A terminal device according to another advantageous embodiment of the present invention is disclosed. A data transmission system according to the present invention is presented. A data transmission system according to another advantageous embodiment of the present invention is presented. A decoder according to the present invention is presented. A decoder according to another advantageous embodiment of the present invention is presented. A storage means according to the present invention is presented. A storage means according to another advantageous embodiment of the present invention is presented.

The present invention is based on the idea that instead of examining the bit stream used in the transmission of a video signal, the decoded video signal is examined, wherein advantageously two assumptions are applied in error detection: the amount of information in a prediction error block should be relatively small and the luminance and chrominance blocks within a macroblock should correlate with each other.

By means of the present invention considerable advantages are attained compared with prior art methods and data transmission systems. By means of the method according to the invention transmission errors in a video signal can be detected more reliably, wherein the effects of the errors can also be concealed in an easier and more efficient manner. Thus, the method according to the invention is especially suitable for use in low bit-rate data transmission systems in which retransmission cannot be used practicably.

BRIEF DESCRIPTION OF THE SEVERAL VIEWS OF THE DRAWING(S)

In the following, the invention will be described in more detail with reference to the appended drawings, in which.

DETAILED DESCRIPTION OF THE INVENTION

Figure 2:
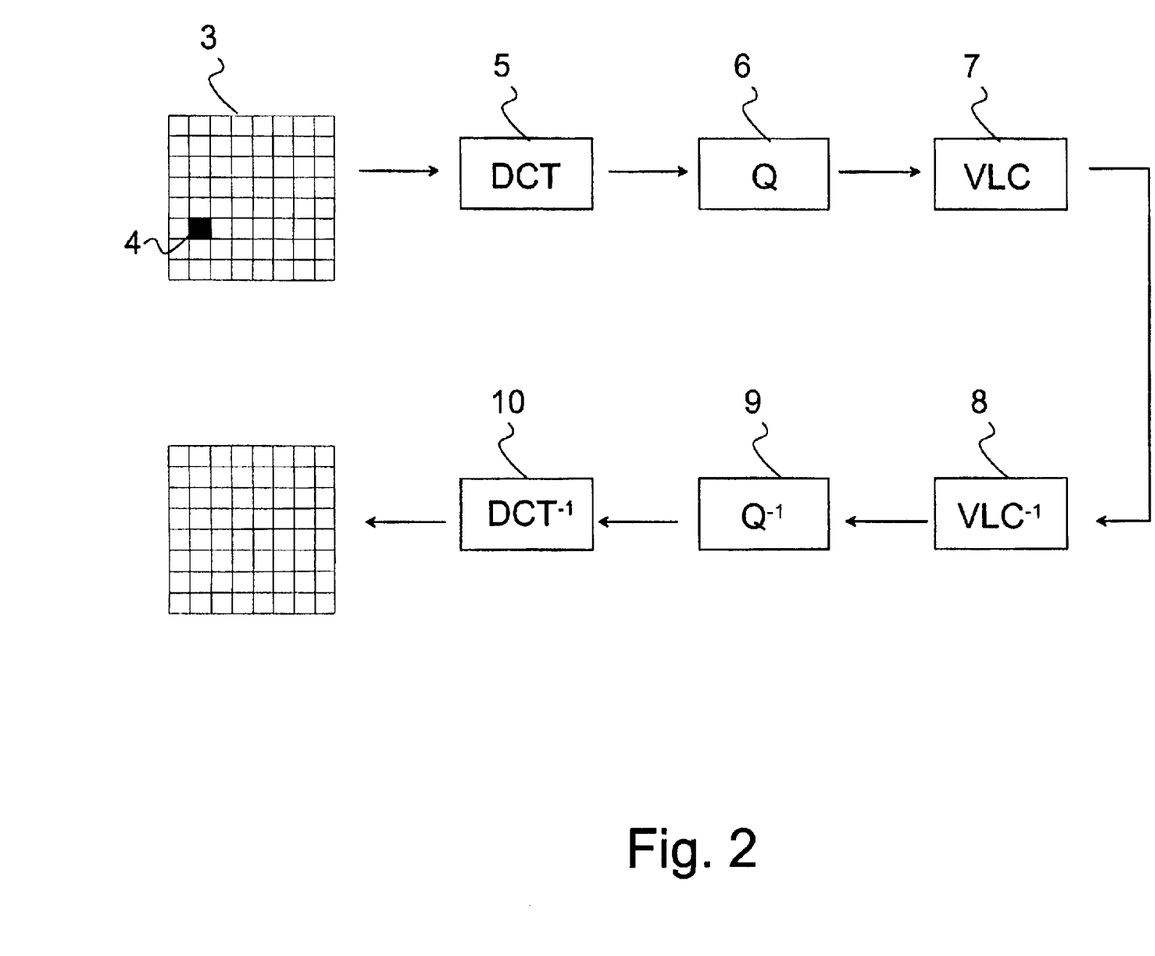
FIG. 2 is a simplified block diagram showing the basic stages of video coding and decoding.

FIG. 2 is a simplified block diagram showing the basic stages of video coding and decoding and is known as such by a person skilled in the art. A digital image is produced by taking samples and quantizing analogue image information, after which the digital image is transformed into a continuous bit stream. A video sequence comprises several successive digital images. The digital signal enables the use of advanced digital signal processing tools, by means of which faster and more reliable data transmission is attained. Recently, a number of image coding algorithms have been developed, by means of which it is possible to reduce the number of bits required to represent a digital image, and, correspondingly, to reduce the bit-rate required for the transmission of digital images. A digital image 3 is divided 4 into small blocks, comprising a certain number of pixels (e.g. one block comprises 8×8 pixels). Typically, at least some of the successive images in a video sequence are coded using motion compensated inter-coding, wherein the information related to motion compensation is transmitted as motion vectors and possible prediction error information is transmitted in prediction error blocks. The data contained in each prediction error block is transformed into the spatial frequency domain using a discrete cosine transform 5. The DCT matrix thus produced is quantized 6 and the quantized signal is coded using a table 7 of variable length code words. Thus, it is not the quantized signal that is transmitted to the data transmission channel, but rather code words selected e.g. from a coding table (not shown) on the basis of the signal information. The coded signal is transmitted to a receiver. At the receiving end inverse operations 8, 9 and 10 are performed in reverse order to reconstruct the image.

Figure 3:
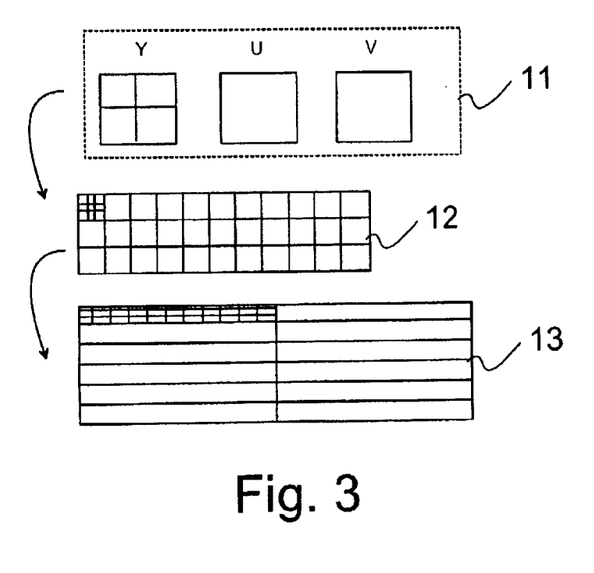
FIG. 3 shows an example of the block structure of a video image.

The resolution of a digital image is determined by the number of pixels used in the image matrix. By sampling the luminance component (Y) and the two chrominance components (U, V) with an accuracy of 8 bits, it is possible to attain $2^{24}$~16 million colours. The human eye is more sensitive to luminance information than chrominance information, and thus the chrominance components are usually spatially sub-sampled. In this way, two chrominance blocks are advantageously used for every four luminance blocks. As can be seen in the appended FIG. 3, a group of four luminance blocks and two chrominance blocks constitutes a macroblock 11 and an image complying with ITU-T recommendation H.261, for example, comprises twelve groups of blocks (GOB) 12 which comprise 3×11 macroblocks. Corresponding grouping arrangements are used in other coding standards.

Figure 4:
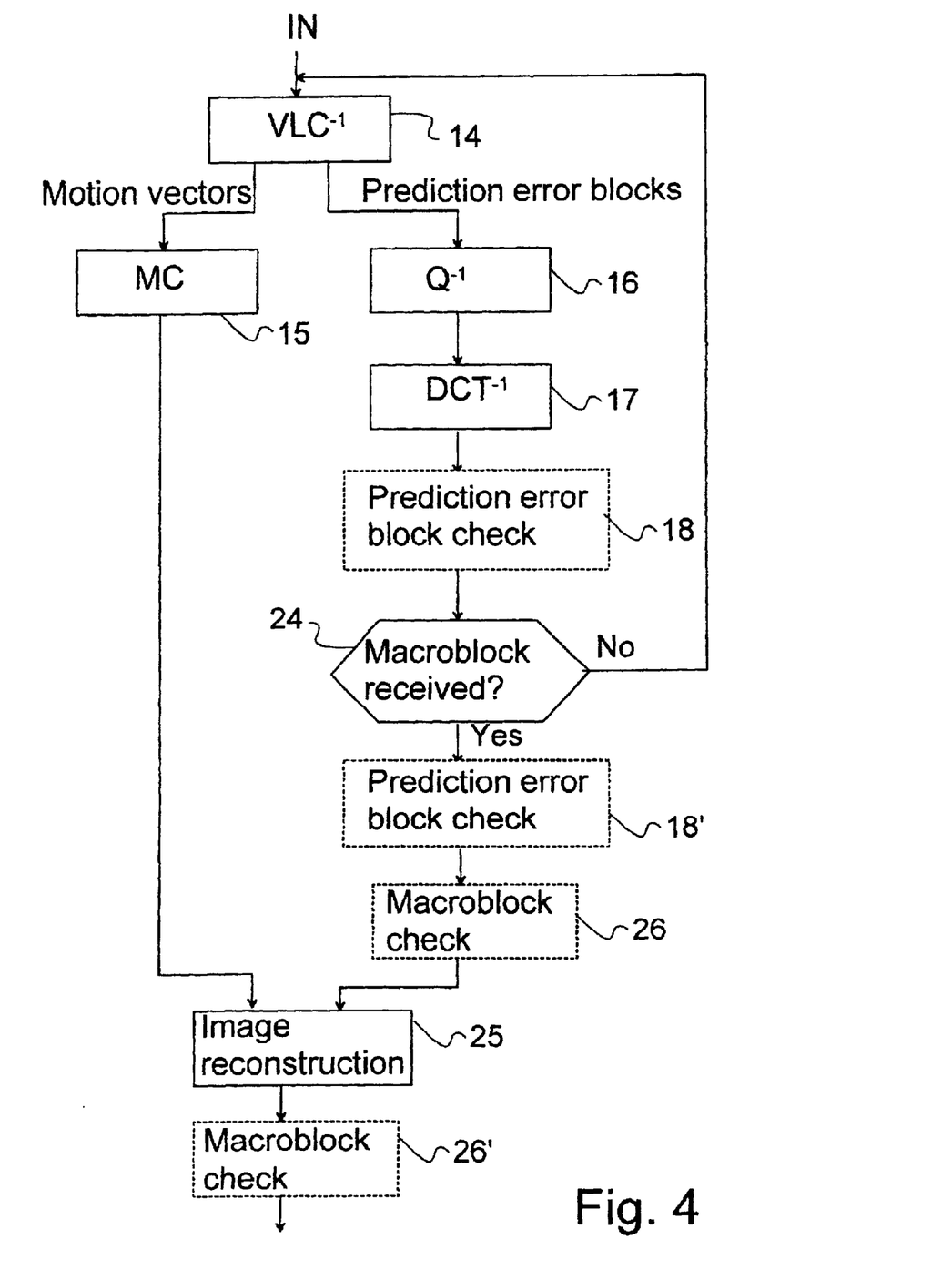
FIG. 4 is a simplified block diagram showing the decoding of an inter-coded macroblock.

The following text describes the operation of a decoding loop for the decoding of inter-coded macroblocks and for the detection of possible errors in a video decoder 49 (FIG. 10) according to a preferred embodiment of the invention as shown in FIG. 4. The video signal can be any image signal, which is divided into blocks for transmission, and in which inter-coding is used. The video signal source can be a video camera, video recorder, digital camera, a video sequence stored in a memory means, etc.

In the decoder 49 the video signal is decoded by performing a decoding operation 14 inverse to the variable length coding process, in which valid code words are identified from the received signal. The code words are advantageously stored as a table (not shown) in the memory means of the decoder 49, or in another way known as such. A bit pattern corresponding to the code words is retrieved from the table stored in the video decoder.

The video signal is processed in the decoder 49 one prediction error block at a time, i.e. the luminance prediction error block and two chrominance prediction error blocks of a macroblock are processed one by one. On the other hand, it is assumed that the motion vector information is the same for all these blocks, as in current video coding standards, motion vectors are the same for each block of a macroblock. Generally, the method according to the present invention can also be applied in situations where a separate motion vector is provided for each block of a macroblock.

The motion vector of an inter-coded macroblock and each prediction error block are supplied to the input IN of the video decoder preferably in the order in which they are transmitted. In the following it is assumed that the motion vector is transferred to the decoder 49 first, followed by the luminance and chrominance prediction error blocks, but it is obvious that the information can also be supplied to the decoder 49 in a different order. After the code words of the motion vector for the entire macroblock have been decoded 14, motion compensation is performed in motion compensation block 15. At this stage the luminance and chrominance information of a part of a previously decoded and stored image indicated by the motion vector, is retrieved from the memory. Then, this previously decoded image block, corrected with possible prediction error information is used as the information of the current macroblock 25.

Each prediction error block is also supplied to the decoder 49. The prediction error blocks undergo codeword decoding 14 in a manner corresponding to that described above in connection with decoding of the motion vector. After that, the prediction error block is dequantized in dequantization block 16 and an inverse DCT transform is performed on the dequantized prediction error block in an inverse DCT transformer 17. Next, the information decoded from the prediction error block is summed with the information contained in the corresponding motion compensated block, wherein it is possible to reconstruct information corresponding to the contents of the original macroblock, if there were no transmission errors in the received motion compensation information and in the prediction error blocks. It must be stated, however, that to a certain extent quantization, dequantization, DCT transformation and inverse DCT transformation cause inaccuracies in the image, and thus the original image and the decoded image are not completely identical, even if the transmission is error free.

Figure 5:
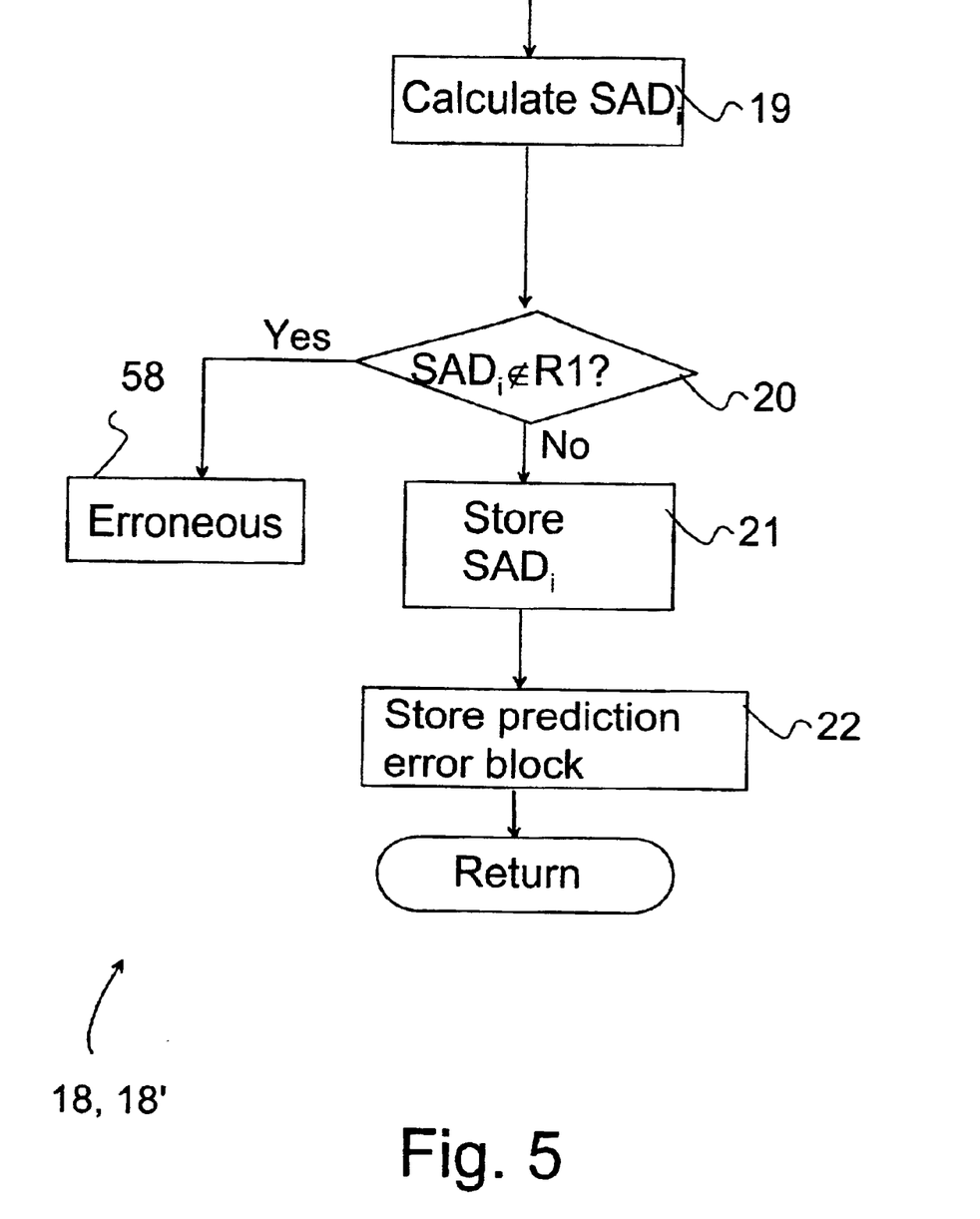
FIG. 5 shows a detail of decoding according to FIG. 4.

In a method according to a preferred embodiment of the invention, the prediction error blocks undergo a block check 18 after codeword decoding and inverse DCT transformation. The block check 18 is illustrated in more detail in the flow diagram of FIG. 5. In the block check, a sum of the absolute values of the prediction error information, or another absolute sum, such as a sum of the squares of the pixel error values is calculated 19 for each block of the luminance component and for both chrominance prediction error blocks. These sums are represented by the reference $SAD_Y$ for the luminance prediction error block, $SAD_U$ for the first chrominance prediction error block and $SAD_V$ for the second chrominance prediction error block. In FIG. 5 the sub-index i indicates that the prediction error block under examination can be a luminance prediction error block Y, the first chrominance prediction error block U, or the second chrominance prediction error block V. The use of absolute values or other unsigned values is necessary because the pixel error values contained by the prediction error blocks can also be negative.

After the sum has been calculated, the calculated sum, $SAD_Y$, $SAD_U$, $SAD_V$ is compared 20 with a first value range R1. If the sum is outside the first value range R1, a decision 58 is made that the prediction error block in question has been erroneously received. The erroneous block is not used as such, but an attempt is made to correct the error, or, it that is not possible, to conceal the error, Erroneous blocks are advantageously supplemented with information on the error, wherein such blocks for which error information is provided, can be directed to an error correction block (not shown) or the like. If an error is not detected, the sum $SAD_Y$, $SAD_U$, $SAD_V$ calculated for this block is stored 21 in the memory.

Said first value range R1 can be defined, for example, such that the allowed value range lies between 0 and TH1, where TH1 represents a first threshold value. Thus, values larger than the first threshold value TH1 are outside the permitted range. It is obvious that the definition of the allowed and non-allowed value ranges presented above is merely an advantageous example, and the value ranges can also be defined in another way. Furthermore, it is obvious that although the same first value range R1 was used for both the luminance component and the chrominance components in the above-presented embodiment, it is also possible to define a value range for the chrominance components which is different from the first value range R1 used for the luminance component.

If the comparison 20 shows that the prediction error block is error-free, the pixel values of the prediction error block, are stored 22 in the memory. In solutions according to prior art, the prediction error block is not usually needed in the following stages, but in the method according to a preferred embodiment of the present invention, it is necessary to store the prediction error block in the memory so that further checks can be performed. At the next stage, it is examined 24 whether the information for the whole macroblock has been received. If the entire macroblock, e.g. all prediction error blocks, have not yet been received, the process returns to decoding block 14 (see FIG. 4 again).

In the embodiment presented above, the prediction error block check 18 was conducted substantially immediately after one prediction error block had been received. In FIG. 4, the reference numeral 18' indicates an alternative location at which the prediction error block can be checked. In this alternative, all prediction error blocks Y, U, V of the macroblock under examination are first received and then the prediction error blocks are checked, advantageously according to the flow diagram of FIG. 5.

When the entire macroblock has been received, a part of the image to be decoded (e.g. image block) corresponding to the macroblock under examination is reconstructed 25.

In a situation where the information to be transferred is divided into parts, motion vector information prediction error block information may be transmitted in different parts. Thus, the part of the image represented by the macroblock (i.e. image block) cannot be reconstructed before all the necessary information has been received.

Although the prediction error blocks were checked before image reconstruction in the embodiment of the method described above, it is obvious that checking can also be performed for each prediction error block Y, U, V, after reconstruction of the image.

Once the entire macroblock has been received and the prediction error blocks it comprises have been decoded and checked for errors in the prediction error block checking stage, a macroblock checking stage is performed. The macroblock checking stage according to a first preferred embodiment of the invention is described in more detail in the flow diagram of FIG. 6. Correspondingly, a macroblock checking stage 26' according to a second preferred embodiment of the invention is described in more detail in the flow diagram of FIG. 11. In an alternative embodiment of the method according to the invention the macroblock checking stage can be performed independently without having previously performed a prediction error block check.

Figure 6:
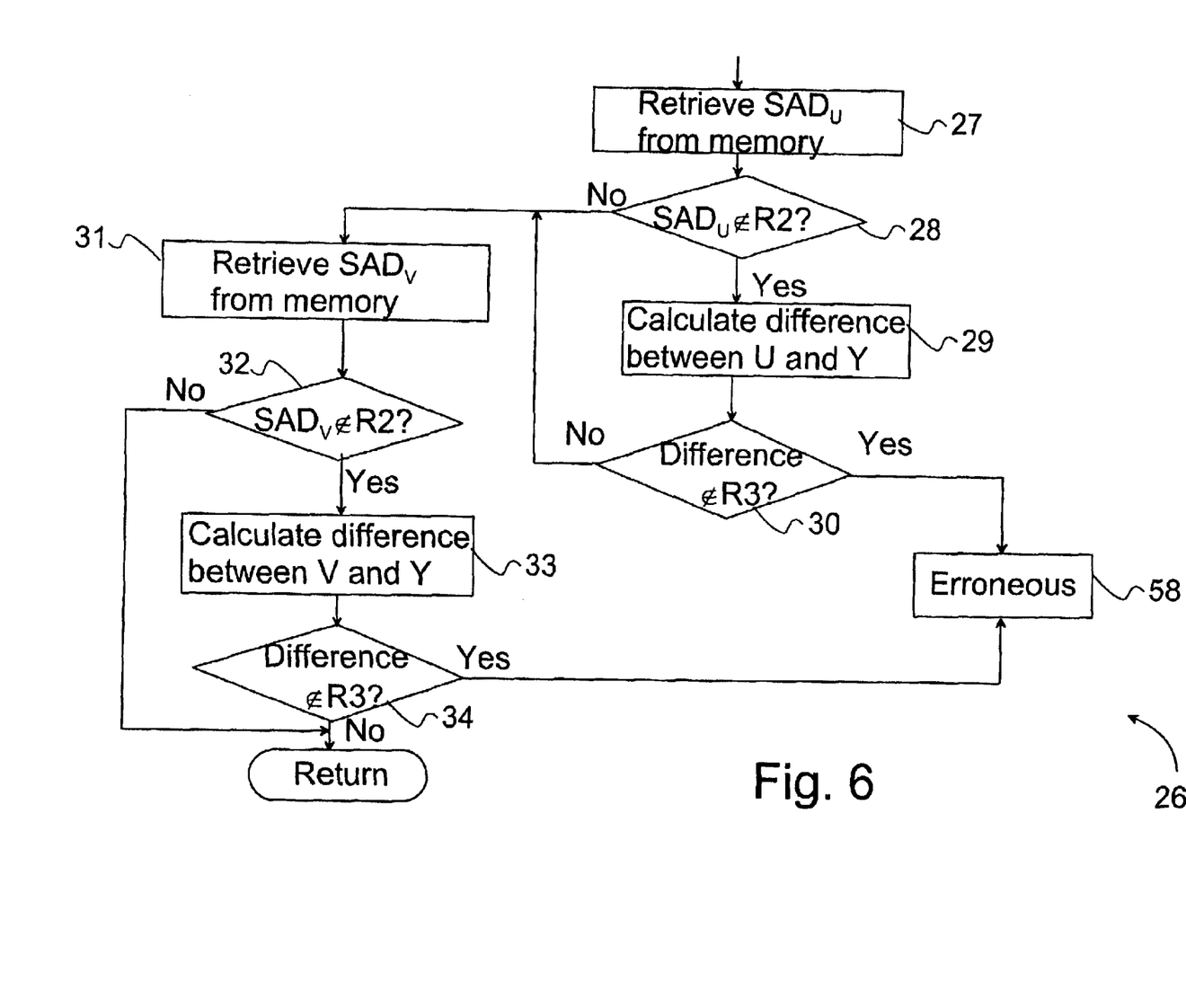
FIG. 6 shows another detail of decoding according to FIG. 4.

In the macroblock checking stage 26 according to the first embodiment of the invention, the stored sum $SAD_U$ calculated from the absolute values of the first chrominance prediction error block is retrieved 27 and compared 28 to a second value range. Typically, the second value range R2 is smaller than the first value range R1. If the sum of the absolute values $SAD_U$ is outside the second value range R2, the next step is to calculate a difference 29 between the sum $SAD_U$ calculated from the absolute values of the first chrominance prediction error block and the sum $SAD_Y$ calculated from the absolute values of the luminance prediction error block. The calculated difference is compared 30 to a third value range R3. If the difference lies outside the third value range R3, it is assumed that the macroblock in question has been erroneously received, whereupon the macroblock is marked as erroneous. If, however, the sum of the absolute values of the chrominance prediction error block falls within the second value range R2 or said difference of the absolute values falls within the third value range R3, the stored sum $SAD_V$ of the absolute values of the second chrominance prediction error block is retrieved 31 and a further comparison 32 is conducted between the sum of the absolute values of the second chrominance component $SAD_V$ and the second value range R2. If the sum of the absolute values of the second chrominance prediction error block $SAD_V$ is outside this second value range R2, the difference 33 between the sum calculated from the absolute values of the values of the second chrominance prediction error block $SAD_V$ and the sum calculated from the absolute values of the values of the luminance prediction error block $SAD_Y$ is calculated. This difference is compared 34 with the third value range R3, and if the difference falls outside the third value range R3, the macroblock is marked as being erroneously received 58. If, however, the comparisons 28, 32 show that both the sum of the absolute values of the first chrominance prediction error block and the sum of the absolute values of the values of the second chrominance prediction error block fall within the second value range R2, it can be assumed that there are no apparent errors in the chrominance prediction error blocks U, V. If the differences between the luminance prediction error block Y and the chrominance prediction error blocks U, V fall within the third value range R3, it can be assumed that they correlate with each other. Blocks interpreted as being received in an error-free manner by means of the above-described method, are transferred to the output OUT of the decoder. Blocks in which errors have been detected, can be marked as erroneous, and are advantageously transmitter to an error correction/error concealment block (not shown). The above-presented decoding and error detection stages are repeated for each macroblock of the image signal.

Advantageously, the aforementioned second R2 and third value ranges R3 can also be defined in a manner similar to the first value range R1, e.g. by defining the second value range with a second threshold value TH2 and by defining the third value with a third threshold value TH3, so that in a preferred embodiment of the invention, errors are detected when the reference value exceeds the corresponding threshold value TH2, TH3.

Figure 11:
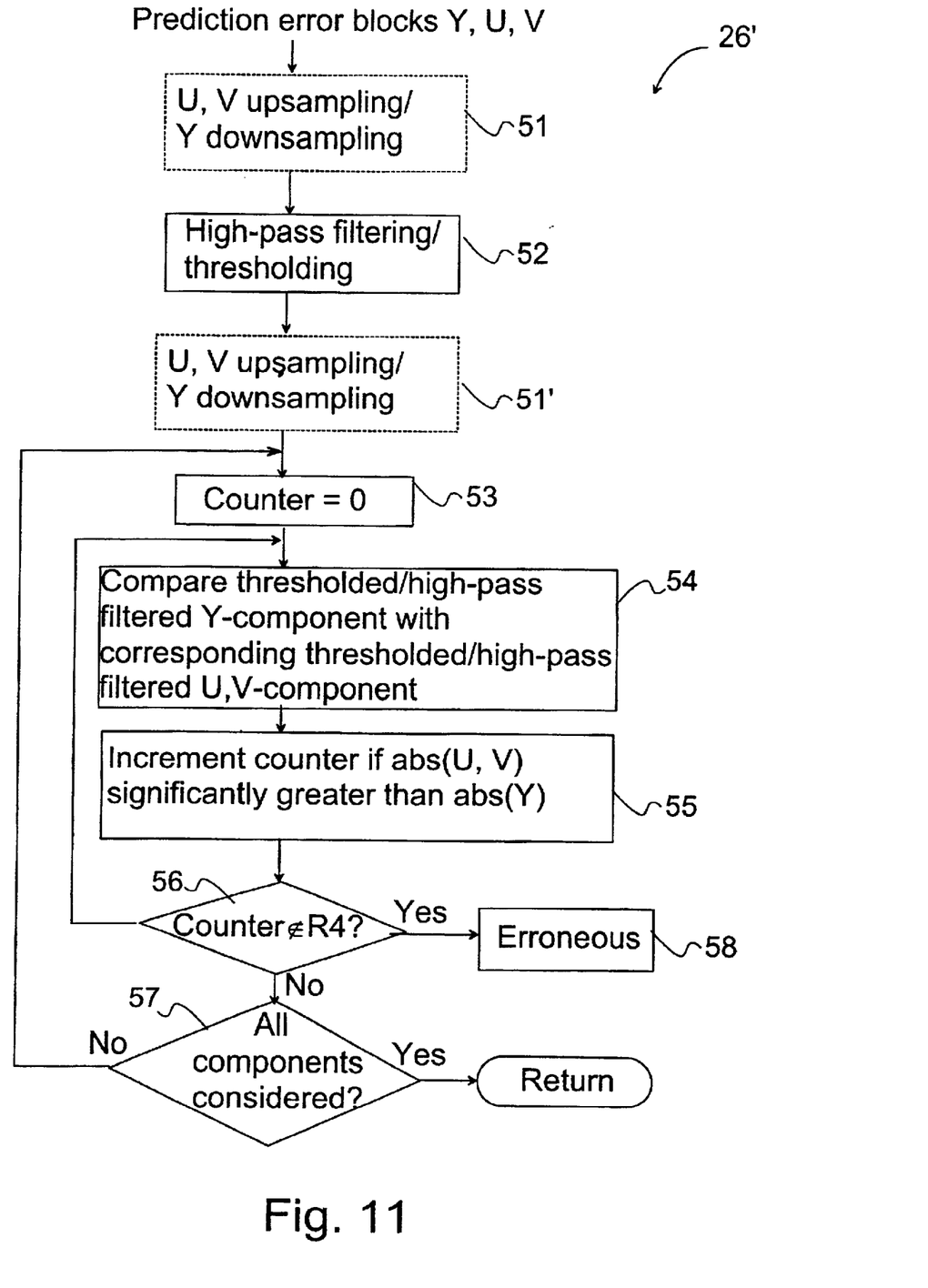
FIG. 11 shows a macroblock checking stage according to a second preferred embodiment of the invention.

In the method according to a preferred embodiment of the invention, it is possible to attempt to find errors by comparing the luminance and chrominance prediction error blocks pixel by pixel. In FIG. 11 this is illustrated in the form of a simplified block diagram. Because the comparison between the luminance prediction error block Y and the first chrominance prediction error block U, and correspondingly between the luminance prediction error block Y and the second chrominance prediction error block V is performed pixel by pixel, one pixel of the chrominance prediction error block U, V corresponds to four pixels of the luminance prediction error block U and this should be taken into account in the comparison. This can be accomplished, for example, by up-sampling the pixels of the chrominance prediction error block U, V, or by down-sampling the pixels of the luminance prediction error block Y. The down-sampling of the luminance prediction error block Y can be performed e.g. by calculating the average value of the four corresponding pixels of the luminance prediction error block Y. This average value is then compared at a later stage with the value (absolute value) of the corresponding pixel in the chrominance block U, V. The up/down-sampling operation is indicated by reference numerals 51, 51' in the flow diagram of FIG. 11. In FIG. 11, the up-/down-sampling block 51, 51' is shown at two alternative locations. The location represented by reference numeral 51 is preferably used in practical applications because, for example, in this way the number of operations to be performed in high-pass filtering/thresholding block 52 is reduced, but the other alternative location 51 can also be used.

The prediction error blocks are filtered 52 by means of thresholding or high-pass filtering, so that only significant pixels of the prediction error block or pixels bordering them are examined. The pixels values of the prediction error blocks are advantageously taken into account as absolute or squared values. In order to determine the location of possible errors in the prediction error blocks, a counter is used which is advantageously set to 0 at the beginning of examination 53. The thresholded or filtered luminance prediction error block Y and the first chrominance prediction error block U are compared 54 with each other pixel by pixel, and correspondingly, the luminance prediction error block Y and the second chrominance prediction error block V are compared 54 with each other pixel by pixel. If there is a significant value in the chrominance prediction error block (e.g. a value which exceeds the threshold value or has passed the high-pass filter without significant attenuation), but there is not a significant value in a corresponding location in the luminance prediction error block, the counter is incremented 55. If, on the other hand, the luminance prediction error block contains a significant value and the chrominance prediction error block does not, the counter is advantageously not incremented, because it is quite common that the luminance prediction error block contains a greater number of larger values than the chrominance prediction error block. Furthermore, the counter is not incremented if there is no significant value in either of the chrominance prediction error blocks, or if there is a significant value at the same location in both chrominance prediction error blocks. When all the pixels of the block have been examined in this way, the counter value is compared 56 with a predetermined fourth value range R4, and if the counter value falls outside the fourth value range R4, the block is marked as erroneous 58 and decoding of thy block can be stopped. Thus, the fourth value range R4 indicates the largest acceptable value for the number of significant differences between corresponding pixels of the luminance prediction error block and the chrominance prediction error blocks. If the counter value falls within the fourth value range R4, it is examined whether all the prediction error blocks of the macroblock under examination have been processed. If they have not all been processed yet, the process returns to block 53. After all the prediction error blocks have been processed, the next step is to exit the macroblock checking stage.

Figure 7:
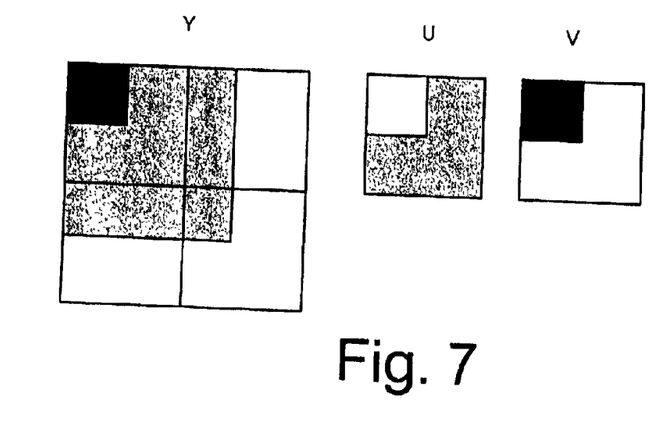
FIG. 7 shows an example of luminance and chrominance blocks which correlate.
Figure 8:
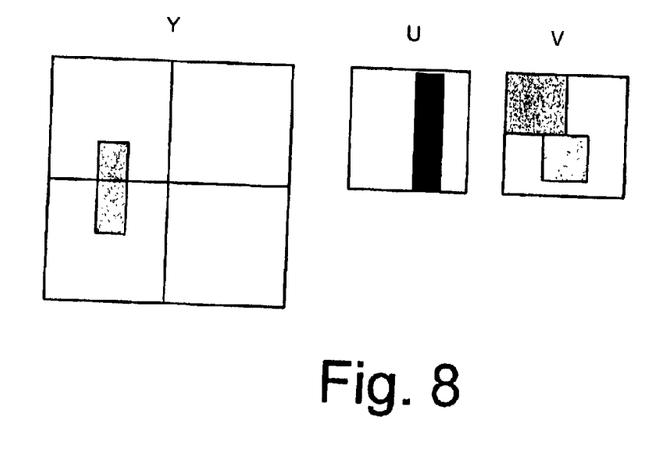
FIG. 8 shows an example of non-correlating luminance and chrominance blocks.

The appended FIG. 7 shows an example situation in which the luminance and chrominance blocks correlate substantially and in a corresponding manner, FIG. 8 illustrates an example situation in which the blocks do not correlate to a significant degree. By applying the method according to the invention, it is possible to determine whether errors have occurred during transmission of a macroblock to the decoder based on the difference between values of the luminance and chrominance prediction error blocks. If the image has been reconstructed from stored samples, the method according to the invention can reveal possible storage errors in a more reliable manner than prior art methods.

Thus, in the method according to the invention, the image signal is examined, in such a way that the amount of information in inter-coded macroblocks is compared with threshold value TH1, TH2, TH3. If the macroblocks contain a relatively large amount of information, it is presumed that the information is at least partly erroneous. This is based on the assumption that it is more efficient to use intra-coding instead of inter-coding if the reduction in the amount of transmitted information attained by means of inter-coding is insignificant. In other words, if it is necessary to provide a large amount of prediction error information with an inter-coded image block, it is more efficient to code the image block in question in intra format.

Figure 9:
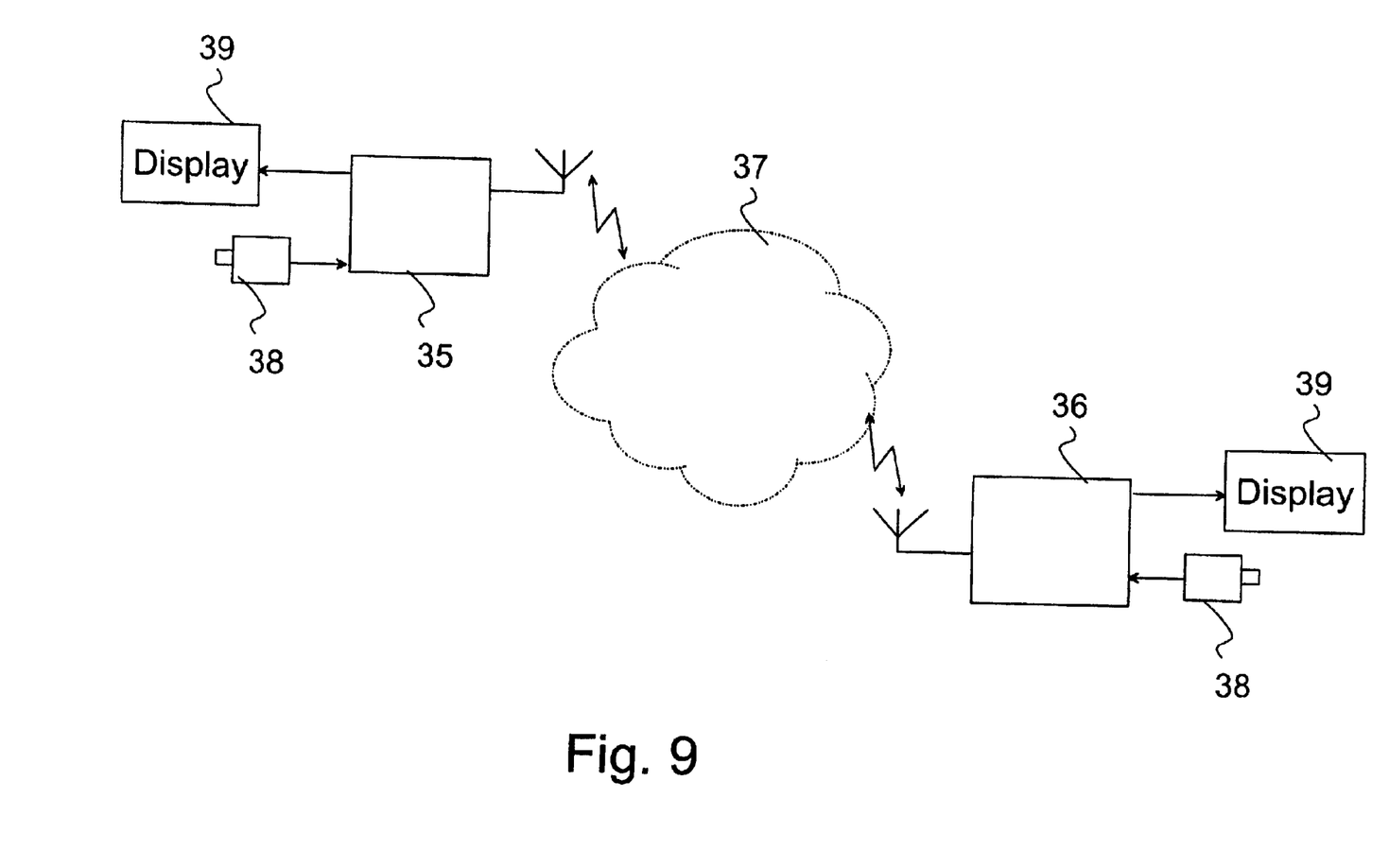
FIG. 9 shows a data transmission system according to a preferred embodiment of the invention.

FIG. 9 illustrates another advantageous data transmission system in which the invention can be applied. The data transmission system advantageously comprises two or more video terminals 35, 36 or corresponding devices equipped with video properties. The video terminals 35, 36 can be arranged in a data transmission connection with each other via a data transmission network 37, such as a mobile communication network, wherein at least part of the data transmission channel is formed by a radio link. For example, in the first video terminal 35 image information is produced by means of a camera 38. The image is transformed into digital form, is folded and modulated to form a signal to be transmitted via the data transmission network 37. The signal is transferred via the data transmission network 37 to the second video terminal 36, where the received signal is demodulated, decoded and subjected to error detection and possibly to error correction or concealment. After that, the image information can be presented on a display device 39. It is obvious that in addition to image information, other information such as sound, text, etc. can also be transferred in the data transmission system.

Figure 10:
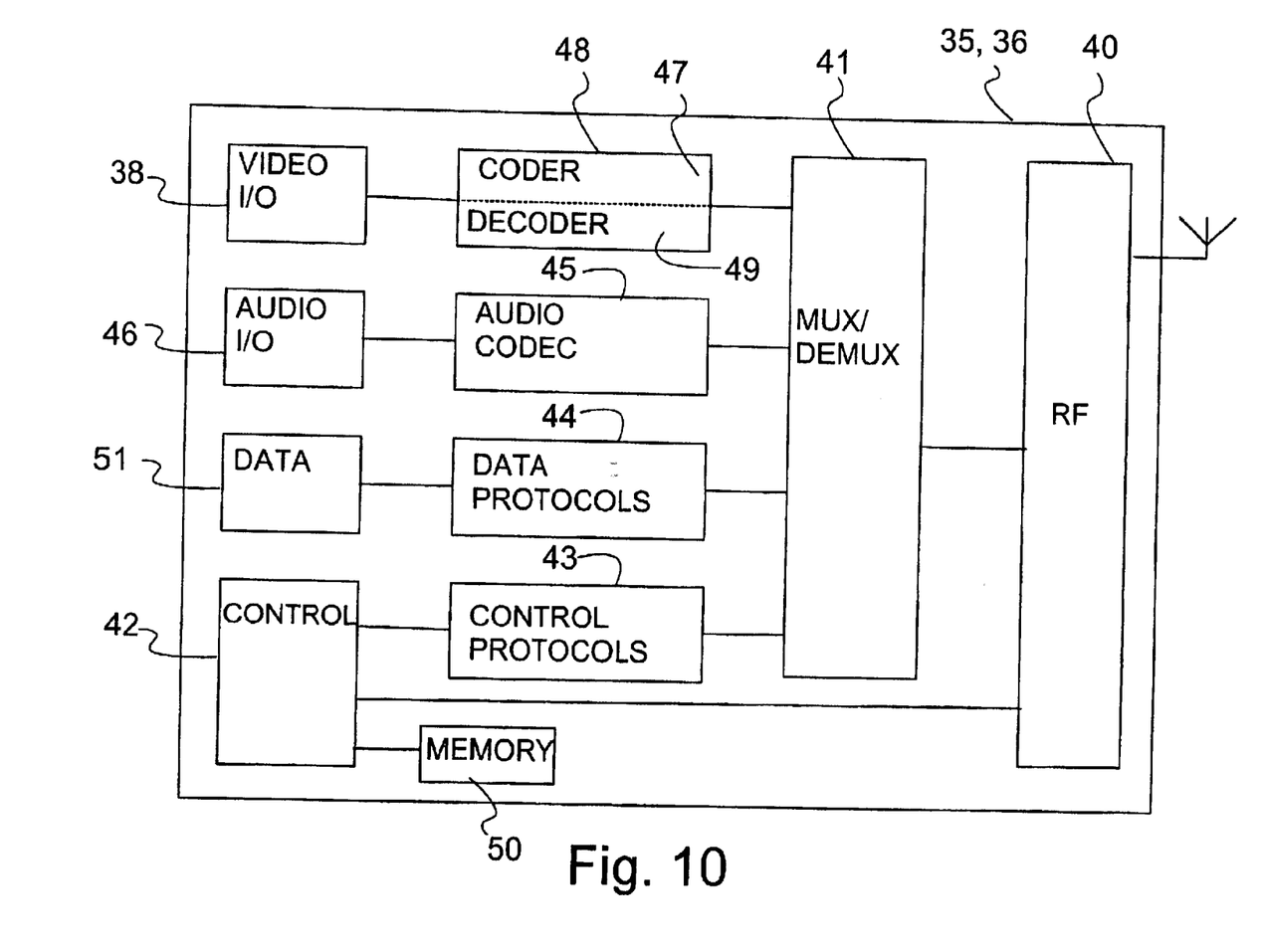
FIG. 10 shows a wireless terminal according to a preferred embodiment of the invention.

FIG. 10 is a simplified block diagram showing a video terminal 35, 36 according to a preferred embodiment of thy invention. The video terminal 35, 36 advantageously comprises at least a radio part 40 which generally comprises transmission means for channel coding, interleaving, encryption, modulation and radio transmission, as well as reception means for radio reception, demodulation, decryption, de-interleaving, and channel decoding. Additionally, the radio part 40 comprises a duplex filter and an antenna. A received bit stream is supplied to a multiplexing/dimultiplexing beck 41. A multiplexing protocol combines the video, audio, data, and control bit streams into a single bit stream for transmission and correspondingly separates the video, audio, data and control bit streams from the received bit stream into separate bit streams. The control protocol 43 of control block 42 conducts the signalling required ed e.g. with the data transmission network during operation of the terminal. Data protocols 44 support data applications 51. An audit codec 45 codes the audio signals arriving from I/O devices 46 for transmission and decodes received coded audio signals. Video codec 47 comprises a video encoder 48 and a video decoder 49. The video encoder the compresses and codes the video signal to be transmitted. The video decoder 49 decodes and decompresses the received video signal and performs error detection and error correction and/or concealment procedures. In the terminal 35, 36 the procedures required in the implementation of the above-described embodiments of the method can be performed e.g. in the video decoder 49 and in the application so far of the control block 42. The control block 42 comprises at least one processor and/or a digital signal processing unit. Additionally, thy video terminal 35, 36 comprises memory means 50 for storing programs and data.

The method according to the invention can also be at least partly implemented by means of software, wherein the stages of the method are programmed as program code. Such a program code can be advantageously executed in the control block 42. A memory means (not shown), such as a data diskette, programmable memory, etc. can be used to store the program.

It is obvious that the present invention is not restricted solely to the embodiments presented above, but it can be modified within the scope of the appended claims.

What is claimed is:

1. A method for detecting errors in an image signal, in which the image signal is produced by dividing an image into image blocks, and a coding stage is performed in which at least predictive coding is performed on an image block to produce inter-coded image information for said image block, said inter-coded image information comprising at least one prediction error block containing prediction error information, and a decoding stage is performed to recover prediction error information contained in said at least one prediction error block, wherein a prediction error block check is performed in which prediction error information contained in said at least one prediction error block is examined to detect errors in the inter-coded image information for the image block, said inter-coded image information for the image block comprises a macroblock comprising at least one luminance prediction error block containing prediction, error information relating to a luminance component of the image signal and at least one chrominance prediction error block containing prediction error information relating to a chrominance component of the image signal, said image signal comprising at least one chrominance component, the prediction error information contained in said at least one luminance prediction error block and said at least one chrominance prediction error block of said macroblock comprise pixel error values and said pixel error values of said at least one luminance prediction error block and said pixel error values of said a least one chrominance prediction error block are filtered to determine pixel error values of said at least one luminance prediction error block and said at least one chrominance prediction error block which are significant with respect to a threshold value and a third comparison stage is performed in which significant pixel error values comprised by said at least one chrominance prediction error block of said macroblock are compared with pixel error values at corresponding locations in said at least one luminance prediction error block, wherein if the number of locations for which a pixel error value in said at least one chrominance prediction error block is significant with respect to said threshold value and a pixel error value at a corresponding location in said at least one luminance prediction error block is not significant with respect to said threshold value exceeds a fourth value range, the inter-coded image information for the image block is considered to contain at least one error.

2. A terminal comprising means for receiving an image signal, the image signal having been formed by dividing an image into image blocks and performing a coding stage using at least predictive coding on an image block to produce inter-coded image information for the image block, said inter-coded image information comprising at least one prediction error block containing prediction error information, and decoding means for recovering prediction error information contained in said at least one prediction error block, wherein the terminal also comprises means for performing a prediction error block check in which prediction error information contained in said at least one prediction error block is examined to detect errors in the inter-coded image information for the image block, means for producing macroblocks comprising at least one luminance prediction error block containing prediction error information relating to a luminance component of the image signal and at least one chrominance prediction error block containing prediction error information relating to a chrominance component of the image signal, said image signal comprising at least one chrominance component, means for performing a macroblock check if no errors are detected by said means for performing a prediction error block check, said means for performing a macroblock check comprising means for examining a correspondence between prediction error information relating to a luminance component of the image signal and prediction error information relating to at least one of said at least one chrominance component of the image signal to detect errors in the inter-coded image information for the image block, wherein said means for performing a macroblock check further comprise:

means for performing a second comparison stage in which a second reference value calculated on the basis of said at least one chrominance prediction error block of said macroblock is compared with a second value range;

means for calculating a difference on the basis of said at least one luminance prediction error block and said at least one chrominance prediction error block of the macroblock if said second reference value falls outside said second value range;

means for comparing said difference with a third value range; and means for indicating that the inter-coded image information for the image block is considered to contain at least one error if said difference falls outside said third value range, means for setting said second reference value equal to said first reference value calculated for said at least one chrominance prediction error block of said macroblock by said means for performing a prediction error block check.

3. A terminal comprising means for receiving an image signal, the image signal having been formed by dividing an image into image blocks and performing a coding stage using at least predictive coding on an image block to produce inter-coded image information for said image block, said inter-coded image information comprising at least one prediction error block containing prediction error information, and declding means for recovering prediction error information contained in said at least one error block, wherein the terminal also comprises means for performing a prediction error block check in which prediction error information contained in said at least one prediction error block is examined to detect errors in the inter-coded image information for the image block, a terminal comprising means for receiving an image signal, the image signal having been formed by dividing, an image into image blocks and performing a coding state using at least predictive coding on an image block to produce inter-coded image information for the image block said inter-coded image information comprising at least one prediction error block containing prediction error information, and decoding means for recovering prediction error information contained in said at least one prediction error block, wherein the terminal also comprises means for performing a prediction error block check in which prediction error information contained in said at least one prediction error block is examined to detect errors in the inter-coded image information for the image block, means for producing macroblocks comprising at least one luminance prediction error block containing prediction error information relating to a luminance component of the image signal and at least one chrominance prediction error block containing prediction error information relating to a chrominance component of the image signal, said image signal comprising at least one chrominance component, wherein the prediction error information contained in said at least one luminance prediction error block and said at least one chrominance prediction error block of said macroblock comprise pixel error values and the terminal further comprises:

means for filtering said pixel error values of said at least one luminance prediction error block and said at least one chrominance prediction error block of said macroblock to determine pixel error values of said at least one luminance prediction error block and said at least one chrominance prediction error block which are significant with respect to a threshold value;

means for performing a third comparision stage in which significant pixel error values comprised by said at least on chrominance prediction error block are compared with pixel error values at corresponding locations in said at least one luminance prediction error block; and means for indicating that the inter-coded image information for the image block is considered to contain at least one error if the number of locations for which a pixel error value in said at least one chrominance prediction error block is significant with respect to said threshold value and a pixel error value at, a corresponding location in said at least one luminance prediction error block is not significant with respect to said threshold value exceeds a fourth value range.

4. A method according to claim 1, wherein said prediction error block check comprises at least the following stages:

a first calculation stage in which a first reference value is produced on the basis of prediction error information contained in said at least one prediction error block, and a first comparison stage in which the first reference value calculated in the first calculation stage is compared to a first value range, wherein if the first reference value falls outside said first value range, the inter-coded image information for the image block is considered to contain at least one error.

5. A method according to claim 4, wherein in the prediction error block check a luminance prediction error block containing prediction error information relating to a luminance component of the image signal is used in the calculation of said first reference value.

6. A method according to claim 4, wherein in the prediction error block check a chrominance prediction error block containing prediction error information relating to a chrominance component of the image signal is used in the calculation of said first reference value.

7. A method according to claim 1, wherein in the prediction error block check said first calculation stage is performed for each of said at least one luminance prediction error block and for each of said at least one chrominance prediction error block of said macroblock to produce a first reference value for each of said at least one luminance prediction error block and each of said at least one chrominance prediction error block of said macroblock and a corresponding first comparison stage is performed for each of said at least one luminance prediction error block and each of said at least one chrominance prediction error block of said macroblock, wherein if any of said first reference value for said at least one luminance prediction error block or said at least one chrominance prediction error block of said macroblock falls outside said first value range, the inter-coded image information for the image block is considered to contain at least one error.

8. A method according to claim 7, wherein in the prediction error block check said first calculation stage and said first comparison stage are performed consecutively for each of said at least one luminance prediction error block and each of said at least one chrominance prediction error block of said macroblock, and each of said at least one luminance prediction error block and said at least one chrominance prediction error block of said macroblock is examined in a sequence, such that the sequence is terminated if any of said first reference value for said at least one luminance prediction error block or said at least one chrominance prediction error block of said macroblock falls outside said first value range and the inter-coded image information for the image block is considered to contain at least one error.

9. A method according to claim 7, wherein in the prediction error block check said first calculation stage and said first comparison stage are performed substantially immediately as each of said at least one luminance prediction error block or each of said at least one chrominance prediction error block of said macroblock is received.

10. A method according to claim 7, wherein in the prediction error block check said first calculation stage and said first comparison stage are performed for each of said at least one luminance prediction error block and each of said at least one chrominance prediction error block of said macroblock after all of said at least one luminance prediction error block and all of said at least one chrominance prediction error block of said macroblock have been received.

11. A method according to claim 7, wherein in the prediction error block check said first value range is assigned a first value when said comparison stage is performed on said at least one luminance prediction error block of said macroblock and a second value, different from said first value, when said first comparison stage is performed on said at least one chrominance prediction error block of said macroblock.

12. A method according to claim 7, wherein in the prediction error block check if said first reference value calculated for any of said at least one luminance prediction error block or any of said at least one chrominance prediction error block of said macroblock falls within said first value range, said first reference value is stored in a memory.

13. A method according to claim 1, wherein if no errors are detected in the prediction error block check, a macroblock check is performed in which a correspondence between prediction error information relating to the luminance component of the image signal and prediction error information relating to at least one of said at least one chrominance component of the image signal is examined to detect errors in the inter-coded image information for the image block.

14. A method according to claim 13, wherein said macroblock check comprises the following stages:
a second comparison stage in which a second reference value calculated on the basis of said at least one chrominance prediction error block of said macroblock is compared with a second value range, wherein if the second reference value falls outside said second value range, a difference calculated on the basis of said at least one luminance prediction error block and said at least one chrominance prediction error block of the macroblock is compared with a third value range, wherein if the difference falls outside said third value range, the inter-coded image information for the image block is considered to contain at least one error.

15. A method according to claim 14, wherein said second reference value calculated on the basis of said at least one chrominance prediction error block of said macroblock is identical to a corresponding first reference value calculated for said at least one chrominance prediction error block of said macroblock during said prediction error block check, said corresponding first reference value having been stored in a memory in connection with said prediction error block check and retrieved from said memory during said macroblock check.

16. A method according to claim 14, wherein said second value range is smaller than said first value range.

17. A method according to claim 14, wherein if said difference calculated on the basis of said at least one luminance prediction error block and said at least one chrominance prediction error block falls within said third value range and said macroblock comprises at least one other chrominance prediction error block, said second comparison stage is repeated using said at least one other chrominance prediction error block of said macroblock.

18. A method according to claim 14, wherein if said second reference value falls within said second value range and said macroblock comprises at least one other chrominance prediction error block, said second comparison stage is repeated using said at least one other chrominance prediction error block of said macroblock.

19. A method according to claim 13, wherein the image block is reconstructed using said inter-coded image information for the image block after said macroblock check is performed.

20. A method according to claim 13, wherein the image block is reconstructed using said inter-coded image information for the image block before said macroblock check is performed.

21. A method according to claim 1, wherein the filtering is performed by thresholding the pixel error values of said at least one luminance prediction error block and said at least One chrominance prediction error block.

22. A method according to claim 1, wherein the filtering is performed by high-pass filtering the pixel error values of said at least one luminance prediction error block and said at least one chrominance prediction error block.

23. A method according to claim 1, wherein a spatial resolution of said at least one luminance prediction error block of said macroblock is greater than a spatial resolution of said at least one chrominance prediction error block of said macroblock, wherein down-sampling of the pixel error values of said at least one luminance prediction error block is performed so as to reduce the spatial resolution of said at least one luminance prediction error block to correspond with the spatial resolution of said at least one chrominance prediction error block of said macroblock.

24. A method according to claim 1, wherein a spatial resolution of said at least one luminance prediction error block of said macroblock is greater than a spatial resolution of said at least one chrominance prediction error block of said macroblock, wherein up-sampling of pixel error values of said at least one chrominance prediction error block is performed so as to increase the spatial resolution of said at least one chrominance prediction error block to correspond with the spatial resolution of said at least one luminance prediction error block of said macroblock.

25. A method according to claim 1, wherein the prediction error information contained in said at least one prediction error block comprises pixel error values and a discrete cosine transform is applied to the pixel error values at the coding stage in order to form spatial frequency domain prediction error coefficients, wherein an inverse discrete cosine transform is applied to the spatial frequency domain prediction error coefficients prior to said prediction error block check.

26. A method according to claim 1, wherein variable length code words are used in the coding of said at least one prediction error block.

27. A method according to claim 1, wherein the image signal is produced from a video signal.

28. A method according to claim 1, wherein said inter-coded image information is transmitted from a first terminal to a second terminal, wherein at least said coding stage is performed prior to transmission of said inter-coded image information from said first terminal and said decoding stage and said prediction error block check are performed in said second terminal.

29. A method according to claim 13, wherein said inter-coded image information is transmitted from a first terminal to a second terminal, wherein at least said coding stage is performed prior to transmission of said inter-coded image information from said first terminal and said decoding stage and said macroblock check are performed in said second terminal.

30. A terminal according to claim 2, wherein said means for performing a prediction error block check comprise:
means for producing a first reference value on the basis of prediction error information contained in said at least one prediction error block, and
means for comparing the first reference value with a first value range,
means for indicating that the inter-coded image information for the image block is considered to contain at least one error if the first reference value falls outside said first value range.

31. A terminal according to claim 2, wherein means for producing a first reference value comprise means for using a luminance prediction error block, containing prediction error information relating to a luminance component of the image signal in the calculation of said first reference value.

32. A terminal according to claim 2, wherein means for producing a first reference value comprise means for using a chrominance prediction error block containing prediction error information relating to a chrominance component of the image signal in the calculation of said first reference value.

33. A terminal according to claim 2, wherein said means for performing a prediction error block check comprise:

means for performing said first calculation stage for each of said at least one luminance prediction error block and for each of said at least one chrominance prediction error block of said macroblock to product a first reference value of each of said at least one luminance prediction error block and each of said at least on chrominance prediction error block of said macroblock;

means for performing said first comparison stage for each of said at least one luminance prediction error block and each of said at least one chrominance prediction error block of said macroblock; and means for indicating that the inter-coded image information for the image block is considered to contain at least one error if any of said first reference value for said at least one luminance prediction error block or said first reference value for said at least one chrominance prediction error block of said macroblock falls outside said first value range.

34. A terminal according to claim 33, wherein said means for performing a prediction error block check further comprise:

means for performing said first calculation stage and said first comparison stage consecutively for each of said at least one luminance prediction error block and each of said at least one chrominance prediction error block, of said macroblock in a sequence; and means for terminating the sequence if any of said first reference value for said at least one luminance prediction error block or said first reference value for said at least one chrominance prediction error block of said macroblock falls outside said first value range.

35. A terminal according to claim 33, wherein said means for performing a prediction error block check comprise means for performing said first calculation stage and said first comparison stage substantially immediately as each of said at least one luminance prediction error block or each of said at least one chrominance prediction error block of said macroblock is received.

36. A terminal according to claim 33, wherein said means for performing a prediction error block check comprise means for performing said first calculation stage and said first comparison stage for each of said at least one luminance prediction error block and each of said at least one chrominance prediction error block of said macroblock after all of said at least one luminance prediction error block and all of said at least one chrominance prediction error block of said macroblock have been received.

37. A terminal according to claim 33, wherein said means for performing a prediction error block check comprise means for assigning a first value to said first value range when said comparison stage is performed on said at least one luminance prediction error block of said macroblock and means for assigning a second value, different from said first value, to said first value range when said first comparison stage is performed on said at least one chrominance prediction error block of said macroblock.

38. A terminal according to claim 33, wherein said means for performing a prediction error block check comprise means for storing said first reference value in a memory of said terminal if said first reference value calculated for any of said at least one luminance prediction error block or any of said at least one chrominance prediction error block of said macroblock falls within said first value range.

39. A terminal according to claim 2, wherein said means for performing a macroblock check further comprise:

means for retrieving a first reference value stored in a memory of said terminal by said means for performing a prediction error block check; and means for setting said second reference value to said first reference value.

40. A terminal according to claim 2, wherein said means for performing a macroblock check further comprise means for repeating said second comparison stage if said difference calculated on the basis of said at least one luminance prediction error block and said at least one chrominance prediction error block falls within said third value range and said macroblock comprises at least one other chrominance prediction error block, said means for repeating said second comparison stage being arranged to repeat said second comparison stage using said at least one other chrominance prediction error block.

41. A terminal according to claim 2, wherein said means for performing a macroblock check further comprise means for repeating said second comparison stage if said second reference value falls within said second value range and said macroblock comprises at least one other chrominance prediction error block, said means for repeating said second comparison stage being arranged to repeat said second comparison stage using said at least one other chrominance prediction error block.

42. A terminal according to claim 3, wherein said means for filtering said pixel error values comprise means for thresholding the pixel error values of said at least one luminance prediction error block and said at least one chrominance prediction error block of said macroblock.

43. A terminal according to claim 3, wherein said means for filtering said pixel error values comprise means for high-pass filtering the pixel error values of said at least one luminance prediction error block, and said at least one chrominance prediction error block of said macroblock.

44. A terminal according to claim 3, wherein a spatial resolution of said at least one luminance prediction error block of said macroblock is greater than a spatial resolution of said at least one chrominance prediction error block of said macroblock, and that the terminal further comprises means for down-sampling the pixel error values of said at least one luminance prediction error block so as to reduce the spatial resolution of said at least one luminance prediction error block to correspond with the spatial resolution of said at least one chrominance prediction error block.

45. A terminal according to claim 3, wherein a spatial resolution of said at least one luminance prediction error block of said macroblock is greater than a spatial resolution of said at least one chrominance prediction error block of said macroblock, and that the terminal further comprises means for up-sampling the pixel error values of said at least one chrominance prediction error block so as to increase the spatial resolution of said at least one chrominance prediction error block to correspond with the spatial resolution of said at least one luminance prediction error block.

46. A terminal according to claim 2, wherein it is a wireless terminal.

* * * * *